US007165113B2

(12) United States Patent
Karp et al.

(10) Patent No.: US 7,165,113 B2
(45) Date of Patent: Jan. 16, 2007

(54) COMPUTER LANGUAGE FOR DEFINING BUSINESS CONVERSATIONS

(75) Inventors: Alan H. Karp, Palo Alto, CA (US); Kannan Govindarajan, Boston, MA (US); Gregory Pogossiants, Palo Alto, CA (US); Scott L. Williams, Santa Cruz, CA (US); Claudio Bartolini, Bristol (GB); Shamik D. Sharma, Sunnyvale, CA (US); Arindam Banerji, Sunnyvale, CA (US); Dorothea Beringer, Portola Valley, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 765 days.

(21) Appl. No.: 09/994,635

(22) Filed: Nov. 28, 2001

(65) Prior Publication Data

US 2002/0120704 A1    Aug. 29, 2002

Related U.S. Application Data

(60) Provisional application No. 60/253,953, filed on Nov. 28, 2000.

(51) Int. Cl.
*G06F 15/16* (2006.01)
*G06Q 99/00* (2006.01)

(52) U.S. Cl. .................... 709/230; 709/206; 709/207; 705/51; 705/52; 705/54; 705/80

(58) Field of Classification Search ............... 709/230, 709/206, 203, 207; 705/51, 52, 54, 80
See application file for complete search history.

(56) References Cited

U.S. PATENT DOCUMENTS

| 6,247,169 | B1 * | 6/2001 | DeLong ..................... 717/131 |
| 6,757,729 | B1 * | 6/2004 | Devarakonda et al. ...... 709/226 |
| 6,772,216 | B1 * | 8/2004 | Ankireddipally et al. ... 709/230 |
| 2002/0120685 | A1 * | 8/2002 | Srivastava et al. .......... 709/203 |
| 2002/0165872 | A1 * | 11/2002 | Meltzer et al. ............. 707/500 |
| 2002/0188666 | A1 * | 12/2002 | Lemon et al. .............. 709/203 |

OTHER PUBLICATIONS

Andrew Layman, "XML Schema NG Guide", May 1999, Microsoft.*

* cited by examiner

*Primary Examiner*—Rupal Dharia
*Assistant Examiner*—Ranodhi Serrao (57) ABSTRACT

A conversation definition language (CDL) is disclosed that programmers may use to define sequences of interactions for communicating with a web service to facilitate use of the web service. CDL enables web services provided by different entities to engage in flexible and autonomous interactions. Using CDL, services can communicate by exchanging messages, and the message exchanges are expected to follow a specific pattern (i.e., a conversation). CDL is used to define the conversation, such that a service may expect a particular message in response to transmitting a particular message. CDL includes document type descriptions, interactions and transitions for describing a conversation. The document type descriptions describe the messages that may be exchanged. The interactions describe the type of actions (e.g., receive and/or transmit a message) that may be performed, and the transitions describe the possible sequences of the interactions.

23 Claims, 5 Drawing Sheets

```
300
305
  -<Conversation id="conv123" name= "StoreFrontService" InitialInteraction ="Start"
    FinalInteraction ="End">
  - <ConversationInteractions>
      <Interaction InteractionType = "Empty" id="Start" />
310   <Interaction InteractionType= "Empty" id="End" />
311   <Interaction StepType="ReceiveSend" id="Startup">
312   - <InboundXMLDocuments>
          <InboundXMLDocument
            hrefSchema="http://convl23.org/LoginRQ.xsd" id="LoginRQ" />
          <InboundXMLDocument hrefSchema = "RegistrationRQ.xsd"
            id = "RegistrationRQ" />
        </InboundXMLDocuments>
      - <OutboundXMLDocuments>
          <OutboundXMLDocument
            hrefSchema="http://conv123.org/ValidLoginRS.xsd"
            id="ValidLoginRS" />
          <OutboundXMLDocument
            hrefSchema="http://conv123.org/RegistrationRS.xsd"
            id = "RegistrationRS" />
        </OutboundXMLDocuments>
      </Interaction >
      -<Interaction StepType="ReceiveSend" id="LoggedIn">
313    - <InboundXMLDocuments>
          <InboundXMLDocument
            hrefSchema="http://convl23.org/CatalogRQ.xsd"
            id ="Catalog RQ" />
        </InboundXMLDocuments>
      - <OutboundXMLDocuments>
          <OutboundXMLDocument
            hrefSchema="http://convl23.org/CatalogRS.xsd"
            id="CatalogRS" />
        </OutboundXMLDocuments>
      </Interaction>
      -<Interaction StepType="ReceiveSend" id ="Registered">
314   - <InboundXMLDocuments>
          <InboundXMLDocument
            hrefSchema="http://convl23.org/LoginRQ.xsd" id="LoginRQ" />
        </InboundXMLDocuments>
      - <OutboundXMLDocuments>
          <OutboundXMLDocument
            hrefSchema="http://convl23.org/ValidLoginRS.xsd"
            id="ValidLogiinRS" />
        </OutboundXMLDocuments>
      </Interaction>
      - <Interaction StepType="ReceiveSend" id ="Catalogued">
315
```

*FIG. 3A*

```xml
       - <InboundXMLDocuments>
           <InboundXMLDocument
              hrefSchema="http://convl23.org/QuoteRQ.xsd" id="QuoteRQ" />
         </InboundXMLDocuments>
       - <OutboundXMLDocuments>
           <OutboundXMLDocument
              hrefSchema="http://convl23.org/QuoteRS.xsd" id="QuoteRS" />
         </OutboundXMLDocuments>
       </Interaction >
      - <Interaction StepType="ReceiveSend" id ="Quotation>
316 ⟋ - <InboundXMLDocuments>
           <InboundXMLDocument
              hrefSchema="http://convl23.org/PurchaseOrderRQ.xsd"
              id="PurchaseOrderRQ" />
         </InboundXMLDocuments>
       - <OutboundXMLDocuments>
           <OutboundXMLDocument
              hrefSchema="http://convl23.org/InvoiceRS.xsd"
              id="InvoiceRS" />
         </OutboundXMLDocuments>
       </Interaction>
       - <Interaction StepType="ReceiveSend" id= "Invoiced">
317 ⟋ - <InboundXMLDocuments>
           <InboundXMLDocument
              hrefSchema="http://convl23.org/AuthorizePaymentRQ.xsd"
              id="AuthorizePayrnentRQ" />
         </InboundXMLDocuments>
       - <OutboundXMLDocuments>
           <OutboundXMLDocument
              hrefSchema="http://convl23.org/ConfirmationRS.xsd"
              id="ConfirmationRS" />
         </OutboundXMLDocuments>
       </Interaction>
         - <Interaction StepType="ReceiveSend" id="end">
318 ⟋     <InboundXMLDocuments />
           <OutboundXMLDocuments />
         </Interaction>
       </ConversationInteractions>
      - <ConversationTransitions >
       - <Transition>
320 ⟋     <SourceInteraction href="Start" />
           <DestinationInteraction href="Startup" />
         </Transition>
       - <Transition >
321 ⟋     <SourceInteraction href= "Startup" />
```

*FIG. 3B*

```
            <DestinationInteraction href="LoggedIn" />
            <TriggeringDocument href="ValidLoginRS" />
         </Transition>
         <Transition>
322          <SourceInteraction href="Startup" />
            <DestinationInteraction href = "Registered" />
            <TriggeringDocument href= "RegistrationRS" />
         <Transition>
323          <SourceInteraction href="Registered" />
            <DestinationInteraction href="LoggedIn" />
            <Triggering Document href="ValidLoginRS" />
         </Transition>
         <Transition>
324          <SourceInteraction href="LoggedIn" />
            <DestinationInteraction href= "Catalogued" />
            <Triggering Document href ="Catalog RS" />
         </Transition>
         <Transition>
325          <SourceInteraction href= "Catalogued" />
            <Destination Interaction href="Quotation" />
            <TriggeringDocument href="QuoteRS" />
         </Transition>
         <Transition>
326          <SourceInteraction href= "Quotation" />
            <DestinationInteraction href= "Invoiced" />
            <TriggeringDocument href="InvoiceRS" />
         </Transition>
         <Transition>
327       <SourceInteraction href="Invoiced" />
            <DestinationInteraction href="End" />
            <TriggeringDocument href ="Confirmation RS" />
         </Transition>
         <Transition >
328          <Destination Interaction href="End" />
            <TriggeringDocument href="Quit" />
         </Transition >
         </Transition>
      </ConversationTransitions >
   </Conversation>
```

*FIG. 3C*

COMPUTER LANGUAGE FOR DEFINING BUSINESS CONVERSATIONS

RELATED APPLICATION

This patent application claims priority to the U.S. Provisional Application No. 60/253,953, filed on Nov. 28, 2000.

FIELD OF THE INVENTION

The invention is generally related to a computer language. More particularly, the invention is related to a computer language for facilitating communication between web services.

BACKGROUND OF THE INVENTION

Electronic commerce is moving towards a vision of web service based interactions, where businesses use web services to interact with each other dynamically. For example, a service provided by one business could spontaneously decide to engage a service provided by another business.

In order for these services to interact with each other dynamically, they must be able to do three fundamental things. First, businesses (e.g., clients) must be able to discover services provided by other businesses. Second, a service must be able to describe its abstract interfaces and protocol bindings, so that clients can figure out how to invoke the service. Third, a service must be able to describe the kinds of interactions that it supports (e.g., that it expects clients to login before they can request a catalog), so that the service can engage in complex exchanges with its clients.

Universal Description Discovery and Integration (UDDI) specifications address the first problem by defining a way to publish and discover information about web services. Web Services Description Language (WSDL) addresses the second problem by defining a set of XML schemas for describing the interface and protocol bindings of network services.

The last problem is not addressed by either UDDI or WSDL. Neither UDDI nor WSDL currently addresses the problem of how a service can specify sequences of message exchanges (interactions) that it supports.

Web services are much more loosely coupled than traditional distributed applications. This difference impacts both the requirements and usage models for web services. Web services are deployed on behalf of diverse businesses, and the programmers who implement them are unlikely to collaborate with each other during development. However, a purpose of web services is to enable business-to-business interactions. Therefore, web services must support flexible and dynamic interactions. Web services should also be able to discover new services and interact with them dynamically without requiring programming changes to either service.

SUMMARY OF THE INVENTION

An aspect of an embodiment of the invention includes a conversation definition language (CDL) that can be used to define sequences of interactions for communicating with a web service to facilitate use of the web service. These sequences of interactions may be defined in a description file, which is made available to other web services and customers. Therefore, other web services and customers may retrieve the description file to determine how to communicate with the web service.

Another aspect of an embodiment of the invention includes a computer readable medium on which is embedded a computer program. The computer program includes a plurality of interactions describing a plurality of messages to be received and/or transmitted. The computer program also includes at least one transition identifying the order of executing said plurality of interactions.

Another aspect of an embodiment of the invention includes a computer configured to generate a conversation controller from a description file. The conversation controller is operable to perform a sequence of interactions described in the description file, and the sequence of interactions includes at least one of receiving messages and transmitting messages.

Another aspect of an embodiment of the invention includes a computer providing a web service. The computer is configured to communicate with another computer based on a plurality of interactions described in a description file. The plurality of interactions describes messages to be received and messages to be transmitted to the other computer for facilitating the web service.

In comparison to known prior art, certain embodiments of the invention are capable of achieving certain advantages. For example, conversation definitions are separated from workflow. Typically, a protocol defining interactions between entities encapsulates workflows in the protocol. For example, a login workflow may be encapsulated in the protocol. Therefore, a service using the protocol cannot customize the login workflows or provide a different workflow using received login data. CDL does not encapsulate workflows.

CDL includes error detection for detecting documents of incorrect types. Therefore, the service provider does not need to code this type of error detection into the service and does not need to perform the service for each interaction. This is a significant cost and time savings for the service provider.

CDL also supports flexible and dynamic interactions with businesses and customers without requiring programming changes to a service. Those skilled in the art will appreciate these and other advantages and benefits of various embodiments of the invention upon reading the following detailed description of preferred embodiments with reference to the below-listed drawings.

BRIEF DESCRIPTION OF THE DRAWINGS

The invention is illustrated by way of example and not limitation in the accompanying figures in which like numeral references refer to like elements, and wherein:

FIGS. 3A–3C illustrate an exemplary CDL description file for a conversation between the customer 240 and the entity A, shown in FIG. 2.

DETAILED DESCRIPTION OF THE INVENTION

In the following detailed description, numerous specific details are set forth in order to provide a thorough understanding of the invention. However, it will be apparent to one of ordinary skill in the art that these specific details need not be used to practice the invention. In other instances, well known structures, interfaces, and processes have not been shown in detail in order not to obscure unnecessarily the invention.

The prevalent model for web service communication is that web services will publish information about the specifications that they support. UDDI facilitates the publication and discovery of web service information. The current version of WSDL (1.0) is an XML-based format that describes the interfaces and protocol bindings of web service functional endpoints. WSDL also defines the payload that is exchanged using a specific messaging protocol; Simple Object Access Protocol (SOAP) is one such possible messaging protocol.

CDL enables web services provided by different entities to engage in flexible and autonomous interactions. For example, suppose that a client web service in one business discovers a storefront web service provided by another business. These services can communicate by exchanging messages using some common transport (e.g., HTTP) and message format (e.g., SOAP). However, now suppose that the storefront service expects the message exchanges to follow a specific pattern (conversation). CDL may be used to define the conversation, such that the storefront service may expect a particular message in response to transmitting a particular message.

Messages exchanged between web services may include XML documents. Messages may include different types of messages (e.g., types of XML documents), and a type of message may be described by a schema (e.g., an XML schema). CDL enables catalogs of conversation descriptions to be published (e.g., in a registry) and facilitates the introspection of services and their interfaces. It will be apparent to one of ordinary skill in the art that messages may be generated using languages other than XML.

A conversation includes a sequence of exchanges of XML documents between entities. A CDL description file includes the sequence of interactions (e.g., transmitting and/or receiving messages) between entities and the XML document types that may be used in each interaction. Each CDL description describes a single type of conversation from the perspective of a single participant. A service can participate in multiple types of conversations. Furthermore, a service can engage in multiple simultaneous instances of different conversations. A CDL programmer may create a CDL description for a conversation, and publish it in a UDDI-like registry. A developer who wants to create a service that supported a conversation creates and documents service endpoints that support the messages specified by the CDL description for that conversation.

Figure 1:
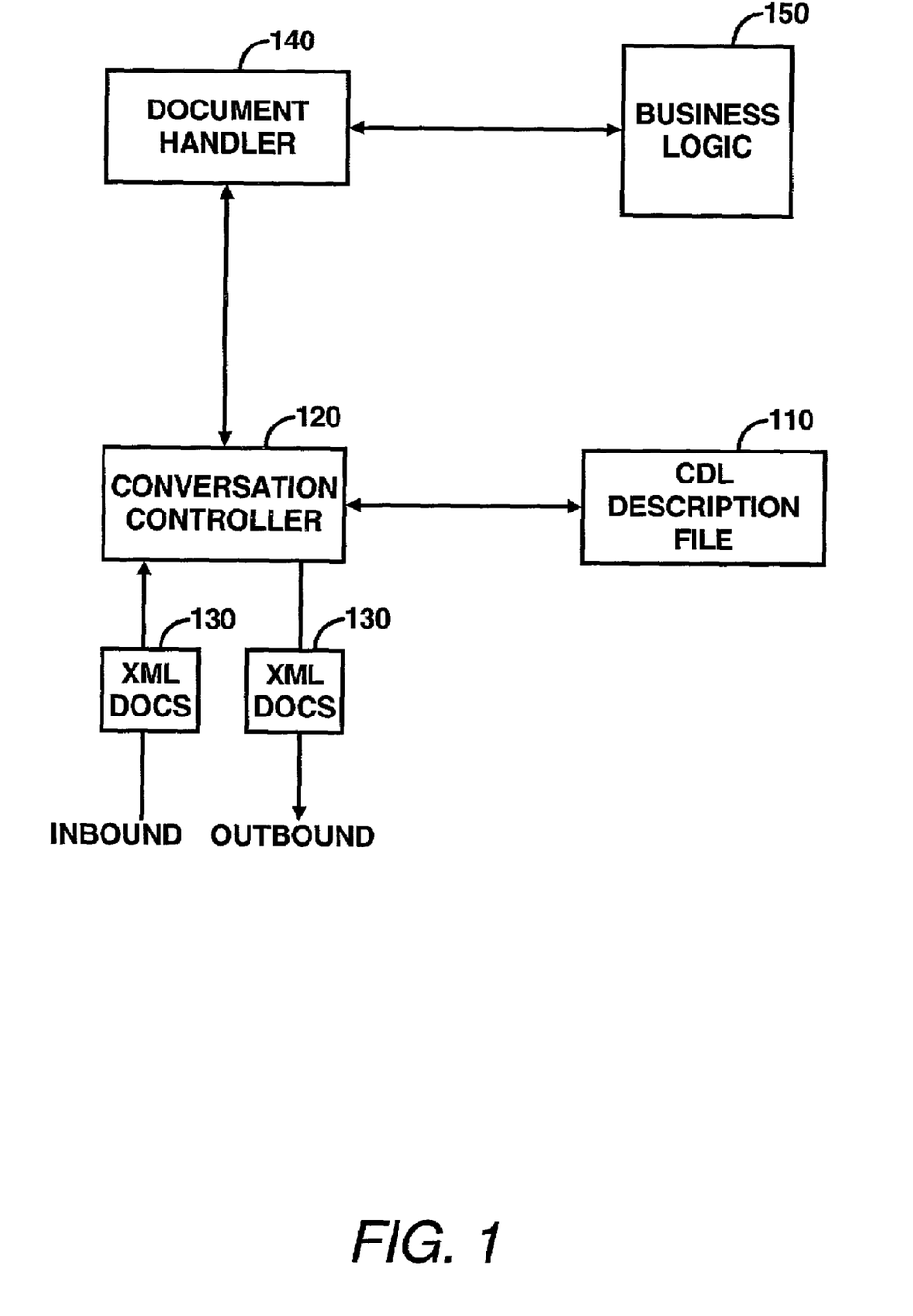
FIG. 1 illustrates a block diagram of an exemplary embodiment of a web service provider employing principles of an embodiment of the invention.

FIG. 1 illustrates an exemplary embodiment of a web service provider 100 employing principles of an embodiment of the invention. The web service provider 100 may publish a CDL description file 110 in a remote registry, such as a registry 210 (shown in FIG. 2), storing CDL description files defining conversations for multiple service providers. Other web service providers and customers may retrieve the CDL description file 110 from the registry, because the CDL description file 110 defines a conversation for interacting with the web service provider 100 to facilitate business-to-business transactions and customer-to-business transactions with the web service provider 100.

Figure 2:
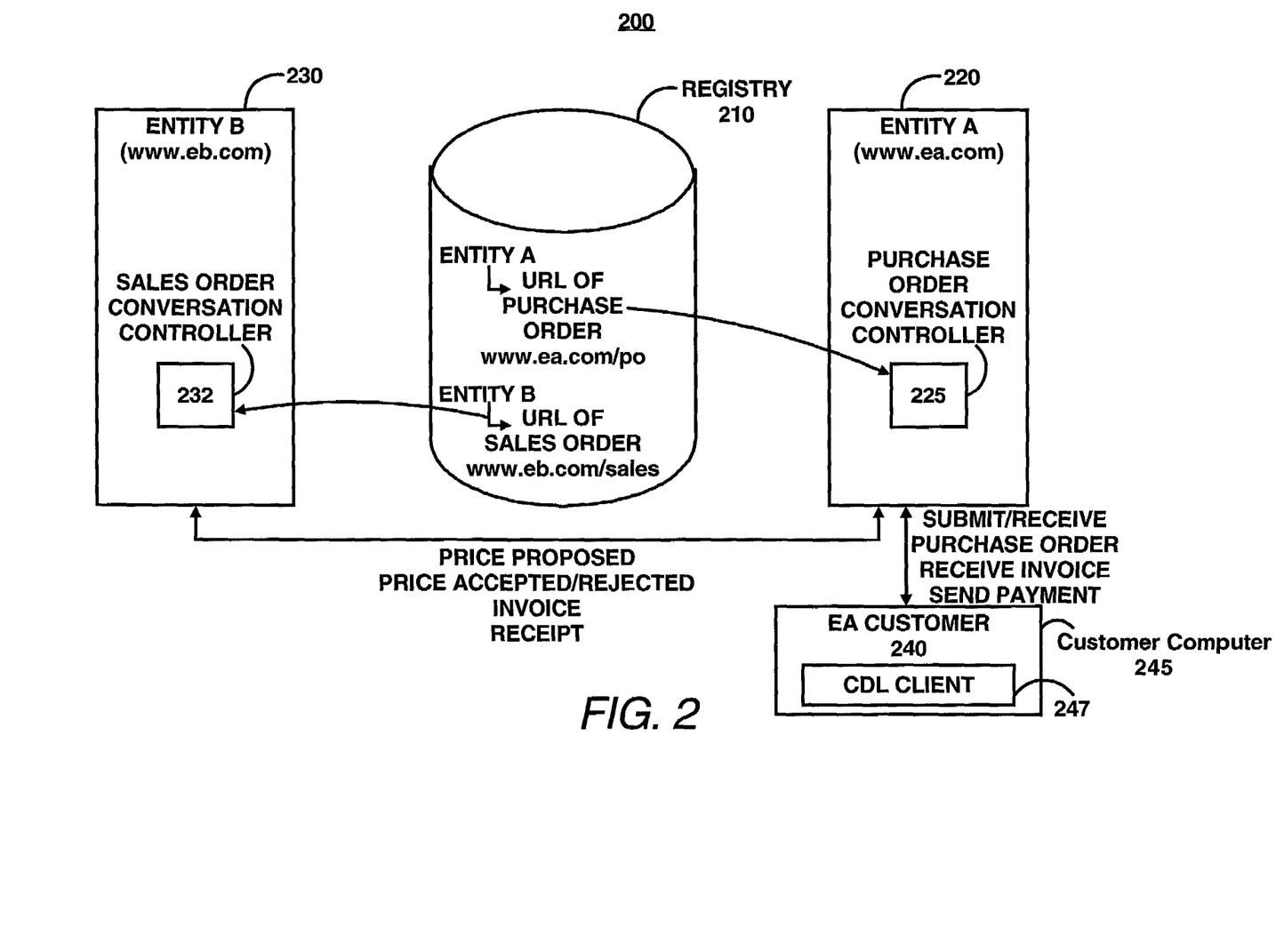
FIG. 2 illustrates a block diagram of an exemplary system employing principles of an embodiment of the invention.

Instead of or in addition to CDL description files, the registry 210 may include a list of CDL description files used by each web service provider. For example, a user may store a plurality of CDL description files for communicating with multiple web service providers. The user may access the registry 210 to identify the CDL description file used by a specific web service provider. Then the user, already having the identified CDL description file, uses the identified CDL file to communicate with the web service provider. Furthermore, the user may not need to access the registry if the user knows which CDL description file is used by this service provider.

The web service provider 100 compiles the CDL description file 110 to generate a conversation controller 120 (e.g., an executable computer program). The conversation controller 120 may transmit and receive XML documents 130 and generate error messages based on the CDL description file 110. A document handler 140 may include deployment descriptors containing mappings and/or transforms that are applied to the XML documents 130, such that the XML documents 130 may be used by the existing business logic 150 of the web service provider 100. It will be apparent to one of ordinary skill in the art that the deployment descriptors may be coded by a CDL programmer for the web service provider 100 depending on the existing code.

The CDL description file 110 may also be incorporated in a service interface, rather than being compiled and executed as a separate program. For example, the CDL description file 110 may be a library or an object.

FIG. 2 illustrates an exemplary system 200 employing principles of an embodiment of the invention. The system 200 embodies an example where a customer 240 orders parts from an entity A (e.g., a web service provider) providing a web service on a computer 220. The entity A sends the order, originating from the customer 240, to a supplier (i.e., entity B) providing a sales order web service using a computer 230. The web services provided by entities A and B may be configured similarly to the web service shown in FIG. 1.

The entities A and B may be registered in a registry 210. The registry 210 may include a UDDI-like registry that lists a location, which may include a uniform resource identifier (e.g., URL, URN, and the like) for each CDL description file provided by the entities A and B. In addition to or alternatively, the registry 210 may include a list of CDL description files used by entities A and B. Therefore, a user or web service provider that desires to communicate with entity A or entity B may access the registry to determine which CDL description file is used by the entity. The registry 210 may be accessed through the Internet and/or through private networks. Entities, including customers, businesses, and the like, may access the registry 210 to identify web services provided by each other. For example, the customer 240 may identify the purchase order service provided by the entity A, and entity A may identify the sales order service provided by the entity B through the registry 210.

The customer 240 may utilize a computer 245 executing a CDL client 247 that exchanges documents with a purchase order conversation controller 225 in the computer 220. The CDL client 247 may retrieve the URL (e.g., www.ea.com/po) of the purchase order conversation controller 225. The customer 240 and the entity A may then engage in a conversation, including an exchange of documents, to facilitate a purchase from the entity A. The interactions between the customer 240 and the entity A may include transmit/receive purchase order, receive invoice, transmit payment, and the like.

The entity A may retrieve the URL (e.g., www.eb.com/sales) for the sales order controller 232 from the registry 210. Entity A and the entity B may then engage in a conversation to facilitate a purchase from the entity B. The interactions between entity A and entity B may include transmit price proposed, receive price accepted, receive price rejected, receive invoice, transmit receipt, and the like.

The computer 220 and the computer 230 may include web servers providing a service over the Internet, and the computer 247 may include a conventional device configured to communicate over the Internet and/or other networks. It will be apparent to one of ordinary skill in the art that the system 200 is functional to provide other services to one or more entities, which may include one or more customers, businesses, and the like.

A conversation includes a set of interactions between entities to fulfill a specific purpose (e.g., to purchase/sell goods, and the like). A conversation defines the documents exchanged in the interactions and possible sequences of interactions. The conversation may be described in a variety of different ways. In one embodiment, the conversation may be described from the point of view of the listener, instead of the initiator. For example, the entity A, shown in FIG. 2, waits for customers to purchase goods through its purchase order service. Conversations between the purchase order conversation controller 125 (i.e., the listener) and customers (i.e., the initiators) are defined from the point of view of the purchase order conversation controller 125, which may be listening for purchase order requests transmitted from the consumers. In another embodiment, each entity has a projection of the conversation. The projection may include the sequence of interactions described from the point of view of the entity.

There are preferably three elements to a CDL description that define a conversation. One element is a document type description. Web services communicate with each other through the exchange of documents, and a CDL conversation description defines all the inbound and outbound document types that may be used in the conversation using document type descriptions. A document type description may refer to a schema (e.g., an XML schema, and the like) that includes attributes (e.g., data types, and the like) that correspond to a particular document type. A document (e.g., an XML document, and the like) of a particular document type includes an instance of the attributes included in the schema for that document type. The schemas of the documents exchanged during a conversation may or may not be specified as part of the CDL specification, and the CDL specification does not restrict this. The actual document schemas may be defined in XML documents that can be referenced by their URL or URN in the interaction elements of the conversation specification. For example, the following document type description defines an input document (i.e., inbound XML document) that conforms to a purchase order schema defined in a file named PurchaseOrderRQ.xsd.

```
<InboundXMLDocument
    hrefSchema="http://www.ea.com/PurchaseOrderRQ.xsd"
    id="PurchaseOrderRQ">
</InboundXMLDocument>
```

In addition to providing the location of the schema (e.g., http://www.ea.com/PurchaseOrderRQ.xsd), the document type description provides an id (e.g., PurchaseOrderRQ) for documents that are of the document type described by the document type description. Document type descriptions are preferably declared in interactions, described in detail below.

A second element of a CDL description is interactions. Interactions model the states of the conversation as document exchanges between conversation participants. Each conversation description describes each interaction in terms of document types that a web service will accept as input or produce as output. CDL supports at least four types of interactions: (1) send (i.e., the service sends out an outbound document), (2) receive (i.e., the service receives an inbound document), (3) Send/Receive (i.e., the service sends out an outbound document, then expects to receive an inbound document in reply), and (4) Receive/Send (i.e., the service receives an inbound document and then sends out an outbound document in response to receiving the inbound document). It will be apparent to one of ordinary skill in the art that CDL is not limited to these four interactions. CDL may also include asynchronous interactions. For example, asynchronous interactions that facilitate "time-out" and "cancel" operations may be embodied in CDL interactions.

Receive and send are one-way interactions. The following interaction definition represents an example of a receive interaction definition in a conversation description file that receives a purchase order document (i.e., PurchaseOrderRQ).

```
<Interaction interactionType="Receive" id="PO">
    <InboundXMLDocuments>
        <InboundXMLDocument id="PurchaseOrderRQ"
            hrefSchema="http://www.ea.com/PurchaseOrderRQ.xsd">
        </InboundXMLDocument>
    </InboundXMLDocuments>
</Interaction>
```

Each interaction definition may also include the ability to select one document from a set of incoming or outgoing documents. For example, a receive interaction may receive a document from a set of document types, and a send interaction can be defined to send a document from a set of document types. Therefore, an interaction definition may include several inbound or outbound document types.

The program interpreting a CDL specification is expected to generate automatically an error message in response to receiving a document not in an interaction definition. For example, the receive interaction PO expects to receive the PurchaseOrderRQ XML document. If a document of different type (i.e., a document type other than described by the schema in PurchaseOrderRQ.xsd) is received, then an error message is generated. Therefore, the existing non-CDL code for a web service does not need to include error detection for detecting documents of the wrong type. Also, error messages corresponding to particular errors may be generated by using exception transitions coded with CDL, described in detail below.

Receive/Send and Send/Receive are two-way interactions. A Receive/Send interaction includes receiving a request and then returning a response. The interaction is not complete until the response has been sent. A Send/Receive interaction includes sending a request and then receiving a response. The interaction is not complete until the response has been received.

As with Send and Receive interactions, Send/Receive and Receive/Send interactions can specify multiple inbound and outbound documents. For example, the following is a definition of a simple Receive/Send interaction that has multiple inbound documents.

```
<Interaction interactionType="ReceiveSend" id="Start">
    <InboundXMLDocuments>
        <InboundXMLDocument id="LoginRQ"
```

```
            hrefSchema="http://www.ea.com/LoginRQ.xsd">
        </InboundXMLDocument>
        <InboundXMLDocument hrefSchema="RegistrationRQ.xsd"
            id="RegistratiorRQ">
        </InboundXMLDocument>
    </InboundXMLDocuments>
    <OutboundXMLDocuments>
        <OutboundXMLDocument id="ValidLoginRS"
            hrefSchema="http://www.ea.com/ValidLoginRS.xsd">
        </OutboundXMLDocument>
        <OutboundXMLDocument id="RegistrationRS"
            hrefSchema="http://www.ea.com/RegistrationRS.xsd">
        </OutboundXMLDocument>
    </OutboundXMLDocuments>
</Interaction>
```

This Receive/Send interaction expects to receive either a LoginRQ document (i.e., a document of the type specified in the schema described in LoginRQ.xsd) or a RegistrationRQ document (i.e., a document of the type specified in the schema described in RegistrationRQ.xsd). The outbound document may include a ValidLoginRS document (i.e., a document of the type specified in the schema described in ValidLoginRS.xsd) or a RegistrationRS document (i.e., a document of the type specified in the schema described in RegistrationRS.xsd). The non-CDL code for the web service determines which document to output based on the received input.

A third element of a CDL description is transitions. Transitions specify the ordering among interactions. A conversation can proceed from one interaction to another according to the defined interactions in the conversation description. The ordering of the interactions is defined in a transition element of a conversation description. The following is an example of a transition element.

```
<Transition transitionType="Basic">
    <SourceInteraction href="#Invoice"/>
    <DestinationInteraction href="#Receipt"/>
    <TriggeringDocument href="#invoiceRS"/>
</Transition>
```

The transition type (e.g., basic) is included in the element. Other transition types (e.g., default and exception) may be used and are described in detail below. The SourceInteraction (e.g., #Invoice) references an interaction that can precede the DestinationInteraction (e.g., #Receipt) when the conversation is executed. Similarly, the DestinationInteraction references one of the interactions that can follow the SourceInteraction when the conversation is executed. All transitions together thus specify all possible sequences of the interactions.

The TriggeringDocument (e.g., #invoiceRS) is an additional constraint on the transition. The TriggeringDocument references which document type must have been exchanged between web services in order for this transition to happen. A particular document type can appear in any number of transitions. What happens when it is received or sent depends on what stage of the conversation it involves.

The TriggeringDocument corresponds to the SourceInteraction definition. If the SourceInteraction is a Send/Receive interaction, the TriggeringDocument has to be among the list of incoming documents that are defined in the InboundXMLDocuments group in the interaction definition. Similarly, if the SourceInteraction is a Receive/Send interaction, the TriggeringDocument should be among the OutBoundXMLDocuments group. This also holds for send and receive interactions. For example, if the source interaction is a receive interaction, the TriggeringDocument should be among the InboundXMLDocuments group that is defined in the interaction.

CDL preferably includes two special transitions: a default transition and an exception transition. For each source interaction, the CDL programmer can also specify one default transition. This is a shortcut in case the same transition can be triggered by more than one triggering document. The default transition may be executed if a document is received that is defined in the SourceInteraction and does not appear as a TriggeringDocument in any of the other defined transitions for this SourceInteraction. No TriggeringDocument is specified for the default transition. There can be at most one default transition definition per SourceInteraction. An exemplary default transition follows:

```
<Transition transitionType="Default">
    <SourceInteraction href="#Invoice"/>
    <DestinationInteraction href="#InvExpected"/>
</Transition>
```

Similarly to the default transition, the exception transition does not define a TriggeringDocument. A DestinationInteraction in an exception transition may be executed when an inbound or an outbound document is of a document type that is not expected by a SourceInteraction in the exception transition. An exemplary exception transition is as follows:

```
<Transition transitionType="Exception">
    <SourceInteraction href="#Invoice"/>
    <DestinationInteraction href="#InvExpected"/>
</Transition>
```

For this example, a document to be transmitted or received that is not of a document type specified in the SourceInteraction of #Invoice will result in a transition to the interaction #InvExpected. Exception transitions are more likely to be defined for receive, Receive/Send, and Send/Receive interactions. No TriggeringDocument is specified, and one exception transition may be defined per SourceInteraction.

Invalid data received in a document may preferably be detected by logic (e.g., business logic 150, shown in FIG. 1, which is non-CDL code) other than CDL. However, an interaction in CDL may be used to identify invalid data as an outgoing document. An exemplary interaction follows:

```
<Interaction interactionType="ReceiveSend" id="Start" >
    <InboundXMLDocuments>
        <InboundXMLDocument id="LoginRQ"
            hrefSchema="http://www.ea.com/LoginRQ.xsd"/>
    </InboundXMLDocuments>
    <OutboundXMLDocuments>
        <OutboundXMLDocument id="ValidLoginRS"
            hrefSchema="http://www.ea.com/ValidLoginRS.xsd"/>
        <OutboundXMLDocument id="InvalidPassword"
            hrefSchema="http://www.ea.com/BadPasswordExcp.xsd"/>
    </OutboundXMLDocuments>
</Interaction>
```

The login interaction above accepts a LoginRQ document, which may contain login information for a user (e.g., user name, password, and the like). The logic other than CDL determines whether the login information is valid. For example, whether the user name is stored; whether the password is correct for the user name; and the like. If the information is valid, a ValidLoginRS document is transmitted. If the information is invalid, an InvalidPassword document is transmitted. Therefore, CDL coding techniques may be used to detect errors other than invalid document type.

Figure 3C:
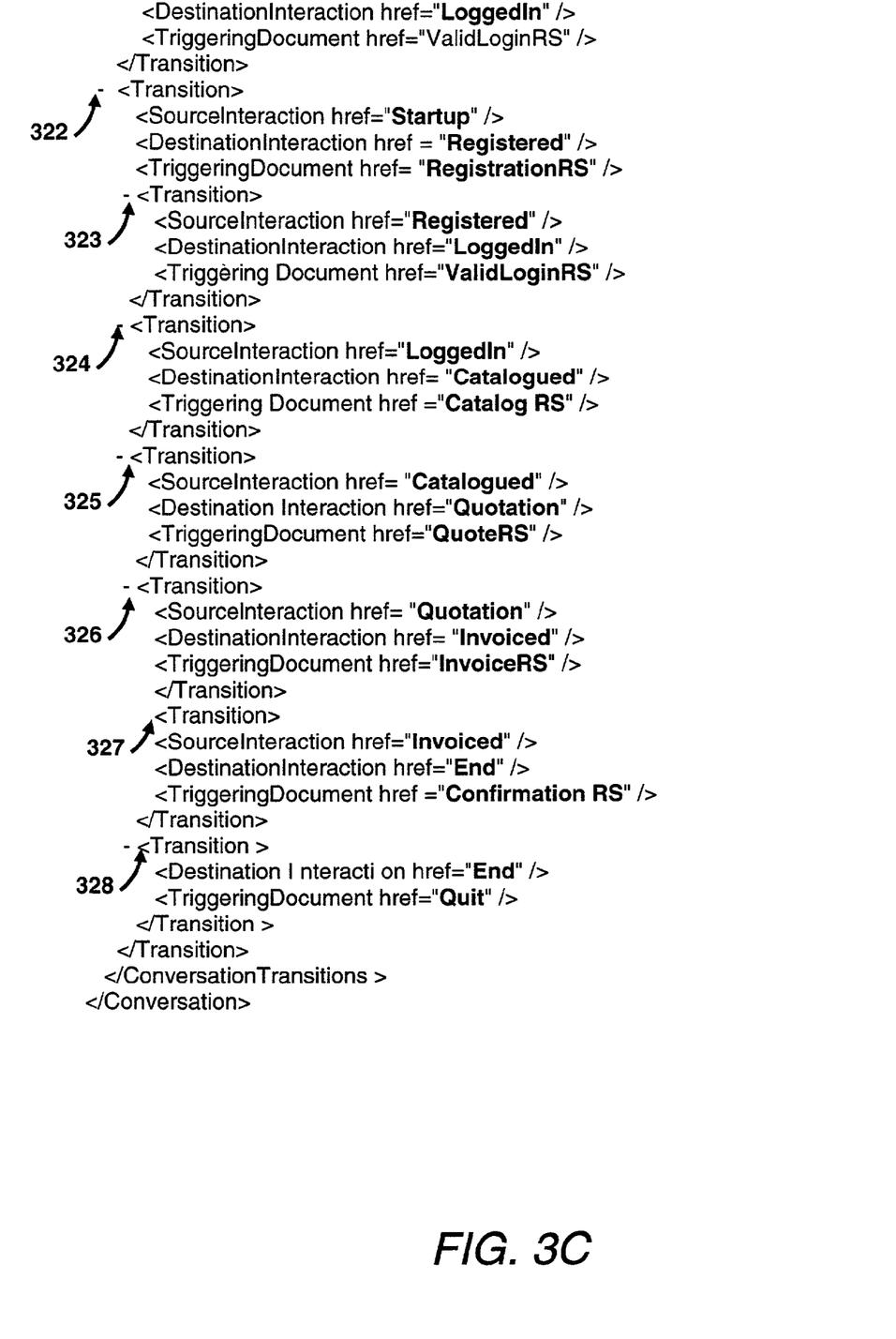

FIGS. 3A–3C illustrate an exemplary CDL description file 300 for a conversation between the customer 240 and the entity A, shown in FIG. 2. A first section 305 of the CDL description file 300 includes the conversation name (i.e., StoreFrontServiceConversation). This conversation may be stored as a CDL description file in the registry 210, and the customer 240 may retrieve this CDL description file 300 to generate a CDL client (e.g., CDL client 247) that can exchange messages with the purchase order conversation controller 225. The StoreFrontServiceConversation is executed by the purchase order conversation controller 225.

The second section of the description file 300 describes the interactions 310–318. For example, interaction 312 includes a Receive/Send login interaction. If the purchase order conversation controller 225 receives a LoginRQ document, the purchase order conversation controller 225 will transmit a ValidLoginRS document to the CDL client 247. If a RegistrationRQ document is received, a RegistrationRS document is transmitted. The non-CDL code for the web service determines which document to output based on the received input.

The interactions 313–317 function similarly to the interaction 312. Although not shown, a conversation may include a one-way interaction (e.g., send). The interactions 310–311 signify a starting point and ending point for the conversation. These interactions may be addressed in transitions as a SourceInteraction or DestinationInteraction, similarly to other interactions.

The third section of the CDL description file 300 includes transitions 320–328, which define the sequences of the interactions 310–318. Transitions 321–328 each include a TriggeringDocument. When a TriggeringDocument is received, the sequence identified by the transition is performed. For example, transition 321 includes ValidLoginRS as a TriggeringDocument. When a ValidLoginRS document is received by the purchase order conversation controller 225, the SourceInteraction Startup is performed. Then, the DestinationInteraction LoggedIn is performed.

Transition 320 is a default transition, which does not include a TriggeringDocument. This sequence identified by this transition is performed when a document is received that is not a TriggeringDocument for the other transitions 321–328.

CDL descriptions may be compiled into computer programs (e.g., the purchase order conversation controller 125, shown in FIG. 2). These computer programs can exist in a variety of forms both active and inactive. For example, the computer program can exist as software comprised of program instructions or statements in source code, object code, executable code or other formats. Any of the above can be embodied on a computer readable medium, which include storage devices and signals, in compressed or uncompressed form. Exemplary computer readable storage devices include conventional computer system RAM (random access memory), ROM (read only memory), EPROM (erasable, programmable ROM), EEPROM (electrically erasable, programmable ROM), and magnetic or optical disks or tapes.

Exemplary computer readable signals, whether modulated using a carrier or not, are signals that a computer system hosting or running the computer program can be configured to access, including signals downloaded through the Internet or other networks. Concrete examples of the foregoing include distribution of executable software program(s) of the computer program on a CD ROM or via Internet download. In a sense, the Internet itself, as an abstract entity, is a computer readable medium. The same is true of computer networks in general.

While this invention has been described in conjunction with the specific embodiments thereof, it is evident that many alternatives, modifications and variations will be apparent to those skilled in the art. For example, CDL has been described using XML documents as messages exchanged between entities during a conversation. Other message types may be used to exchange information during a conversation. Also, it will be apparent to one of ordinary skill that CDL may be used with services, which may not necessarily communicate over the Internet, but communicate with other entities through private networks and/or the Internet. These changes and others may be made without departing from the spirit and scope of the invention.

What is claimed is:

1. A computer readable storage medium on which is embedded a computer program, the computer program comprising:
accessing a remote registry storing a list of description files, each description fife being
customized for a particular service provided by a computer and describes a pattern of message
exchanges expected to be followed and documents types expected to be used for communicating
with the computer to utilize the service;
identifying a description file from the list of description files corresponding to a desired service,
wherein a service provider providing the desired service published the description File for the desired
service in the remote registry;
retrieving an identification of the description fide, a location of the description file or the
description file from the remote registry,
wherein the description file includes
a plurality of interactions describing a plurality of messages to be received and/or transmitted to use the desired service; and
at least one transition identifying the order of executing said plurality of interactions,
the at least one transition including a source interaction of said plurality of interactions
and a destination interaction of said plurality of interactions,
said source interaction being executed prior to said destination interaction,
said source interaction specifying a document type to be used in the source interaction; using the desired service by directly exchanging messages with the service provider providing the desired service, wherein the messages are described in the plurality of interactions in the description rile, and the message exchanging is in the order specified in the at least one transition, and executing the source interaction of the plurality of interactions comprises determining whether a document is an instance of the document type to be used in the source interaction;

and executing the source interaction in response to the document being an instance of the document type.

2. The computer program of claim 1, wherein each of said plurality of interactions describes transmitting a message of said plurality of massages and/or receiving a message of said plurality of messages.

3. The computer program of claim 2, wherein at least one interaction of said plurality of interactions is configured to select one message to be received or transmitted from a set of messages, said set of messages being included in said plurality of messages.

4. The computer program of claim 3, wherein said plurality of messages are XML documents.

5. The computer program of claim 1, wherein said at least one transition includes a triggering message of said plurality of messages, said triggering message invoking execution of said source interaction.

6. The computer program of claim 1, wherein said at least one transition includes a default transition, said source interaction being executed when a message included in said source interaction that does not otherwise have a defined transition is received.

7. The computer program of claim 1, wherein said plurality of interactions describe a plurality of message types for said plurality of messages.

8. The computer program of claim 7, wherein said message types are schemas.

9. The computer program of claim 8, wherein said schemas are XML schemas.

10. The computer program of claim 9, wherein said plurality of interactions include a location or a unique name for said XML schema.

11. The computer program of claim 10, wherein slid location or said unique name includes a URL or a URN.

12. A computer comprising:
a conversation controller generated from a description file,
wherein the computer is operable to
access a remote registry storing a list of description files, each description file being customized for a particular service provided by a computer and describes a pattern of message exchanges expected to be followed and documents types expected to be used for communicating with the computer providing, the service to utilize the service;
identify the description Me from the list of description, corresponding to a desired service, wherein a service provider providing the desired service published the description file for the desired service in the remote registry;
retrieve an identification of the description file, a location of the description file or the description file from the remote registry; and
using the desired service by directly exchanging messages with the service provider providing the desired service; wherein the messages exchanged include the pattern of message exchanges expected to be followed rind documents types expected to be used as described in the description file for the desired service,
said conversation controller being operable to perform a sequence of interactions described in said description file,
said sequence of interactions includes at least one of receiving messages and transmitting messages; and
said description file including a document type for each interaction, the document type specifying a document to be used in the interaction,
wherein said conversation controller is operable to determine whether a document is an instance of a document type for an interaction of said interactions and is operable to execute the interaction in response to the document being the instance of the document type for the interaction.

13. The computer of claim 12, wherein at least one interaction of said sequence of interactions is configured to select one message to be received or transmitted from a set of messages.

14. The computer of claim 12, wherein said messages are XML documents.

15. The computer of claim 12, further comprising at least one transition describing said sequence of interactions, said at least one transition including; a source interaction of said interactions and a destination interaction of said interactions, said source interaction being executed prior to said destination interaction.

16. The computer program of claim 15, wherein said at least one transition includes a triggering; message of said messages, said triggering; message invoking execution of said source interaction.

17. A computer comprising:
a web service,
wherein said computer is connected to a remote registry storing a plurality of description files, each description file being customized for a particular service provided by a computer and describes a pattern of message exchanges expected to be followed and documents types expected to be used for communicating with the computer providing the service to utilize the service,
said computer comprising the web service configured to access the remote registry; and
publish a description file in the remote registry, wherein the description file describes a pattern of message exchanges expected to be followed and documents types expected to be used for communicating with the computer to utilize the web service;
said computer comprising the web service configured to communicate directly with a second computer, wherein the second computer
identified the description file for file web service from a list of the plurality of description files gored in the remote registry;
retrieved an identification or location of the description file far retrieving 1 he description file, or retrieved the description file from the remote registry and is using the retrieved description file to use the web service provided by said computer,
wherein to use the web service, said second computer directly exchanges messages with said computer providing the web service, wherein messages exchanged include the pattern of messages exchanges expected to be followed and the document types expected to be used as described in the description file for the web service;
wherein to use the web service said second computer generates a conversation controller, said conversation controller being operable to perform a sequence of interactions described in said description file, said sequence of interactions includes at least one of receiving messages and transmitting message; and
said description file including a document type for each interaction, the document type specifying a document to be used in the interaction, wherein said conversation controller is operable to determine whether a document is an instance of a document type for an interaction of said interactions and is operable to execute the interaction in response to the document being the instance of the type document type for the interaction;

said computer performing a plurality of interactions described in the description file, said plurality of interactions describing at least one of a message type to be received and a message type to be transmitted to said second computer to facilitate said web service, wherein the message type to be received or the message type to be transmitted includes attributes describing data in a message that corresponds to the message type.

18. The computer of claim 17, wherein said description file includes at least one transition describing at least one sequence for executing one or more of said plurality of interactions.

19. The computer of claim 18, wherein said another second computer communicating with the computer comprising the web service based on the plurality of interactions described in the description file retrieves said description file including said at least one transition and transmits and receives messages to said computer based on said description file including said at least one transition to utilize said web service provided by said computer.

20. The computer of claim 17, wherein each of said plurality of description files are identified by a URN.

21. The computer of claim 17, wherein said message type to be received or transmitted comprises a description of an XML document.

22. The computer of claim 12, wherein said conversation controller is operable to generate an error message in response to the document not being the instance of the document type.

23. The computer of claim 22, wherein an interaction error message in response to the document not being the instance of the document type is provided in the description file.

* * * * *

UNITED STATES PATENT AND TRADEMARK OFFICE
CERTIFICATE OF CORRECTION

PATENT NO. : 7,165,113 B2
APPLICATION NO. : 09/994635
DATED : January 16, 2007
INVENTOR(S) : Alan H. Karp et al.

It is certified that error appears in the above-identified patent and that said Letters Patent is hereby corrected as shown below:

In column 7, line 6, delete "id="RegistratiorRQ">" and insert -- id="RegistrationRQ"> --, therefor.

In column 10, line 30, in Claim 1, after "description" delete "fife" and insert -- file --, therefor.

In column 10, line 39, in Claim 1, after "description" delete "File" and insert -- file --, therefor.

In column 10, line 41, in Claim 1, after "description" delete "fide" and insert -- file --, therefor.

In column 10, line 62, in Claim 1, after "description" delete "rile" and insert -- file --, therefor.

In column 11, line 6, in Claim 2, delete "massages" and insert -- messages --, therefor.

In column 11, line 34, in Claim 11, delete "slid" and insert -- said --, therefor.

In column 11, line 46, in Claim 12, after "providing" delete ",".

In column 11, line 48, in Claim 12, after "description" delete "Me" and insert -- file --, therefor.

In column 11, lines 48-49, in Claim 12, delete "description," and insert -- description files --, therefor.

In column 11, line 58, in Claim 12, after "service" delete ";" and insert -- , --, therefor.

In column 11, line 60, in Claim 12, after "followed" delete "rind" and insert -- and --, therefor.

In column 12, line 18, in Claim 15, after "including" delete ";".

UNITED STATES PATENT AND TRADEMARK OFFICE
CERTIFICATE OF CORRECTION

PATENT NO. : 7,165,113 B2
APPLICATION NO. : 09/994635
DATED : January 16, 2007
INVENTOR(S) : Alan H. Karp et al.

It is certified that error appears in the above-identified patent and that said Letters Patent is hereby corrected as shown below:

In column 12, line 23, in Claim 16, after "a triggering" delete ";".

In column 12, line 24, in Claim 16, after "said triggering" delete ";".

In column 12, line 49, in Claim 17, after "retrieving" delete "1 he" and insert -- the --, therefor.

In column 13, line 20, in Claim 19, after "said" delete "another".

Signed and Sealed this

Thirtieth Day of June, 2009

JOHN DOLL
*Acting Director of the United States Patent and Trademark Office*